June 20, 1933.   K. E. GOLDEN   1,914,947
ELECTRIC APPLICATOR MACHINE
Filed Dec. 30, 1930    2 Sheets-Sheet 1
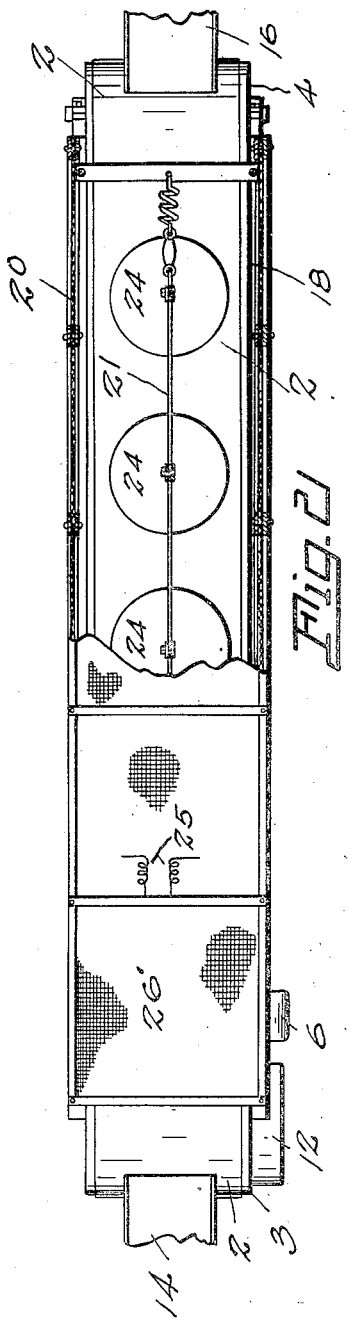
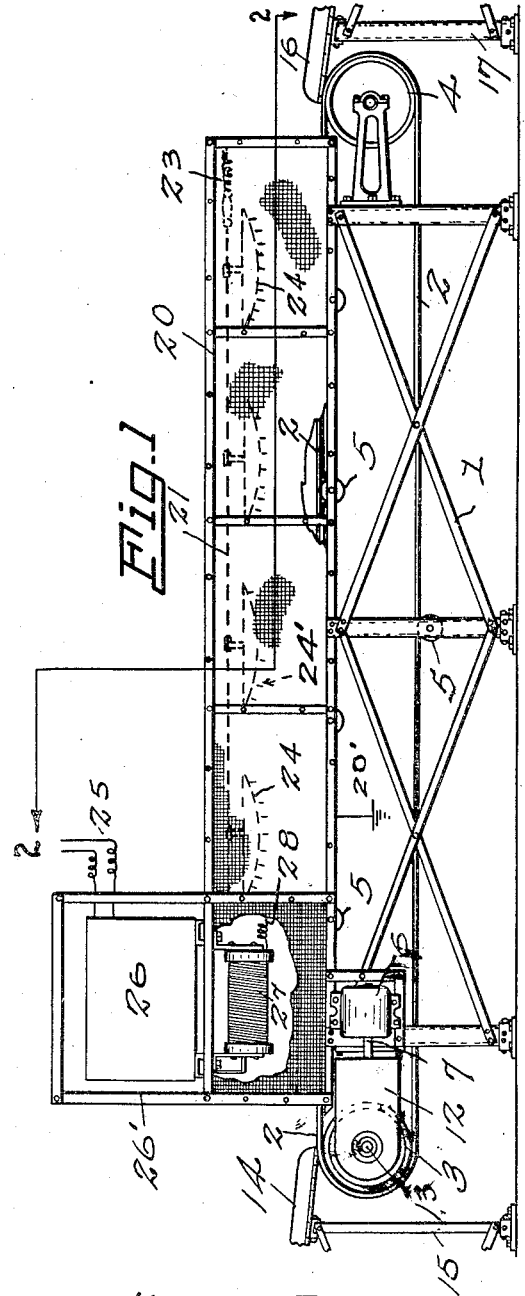
Kenneth E. Golden
Inventor
By *Herbert E. Smith*
Attorney June 20, 1933.  K. E. GOLDEN  1,914,947
ELECTRIC APPLICATOR MACHINE
Filed Dec. 30, 1930  2 Sheets-Sheet 2
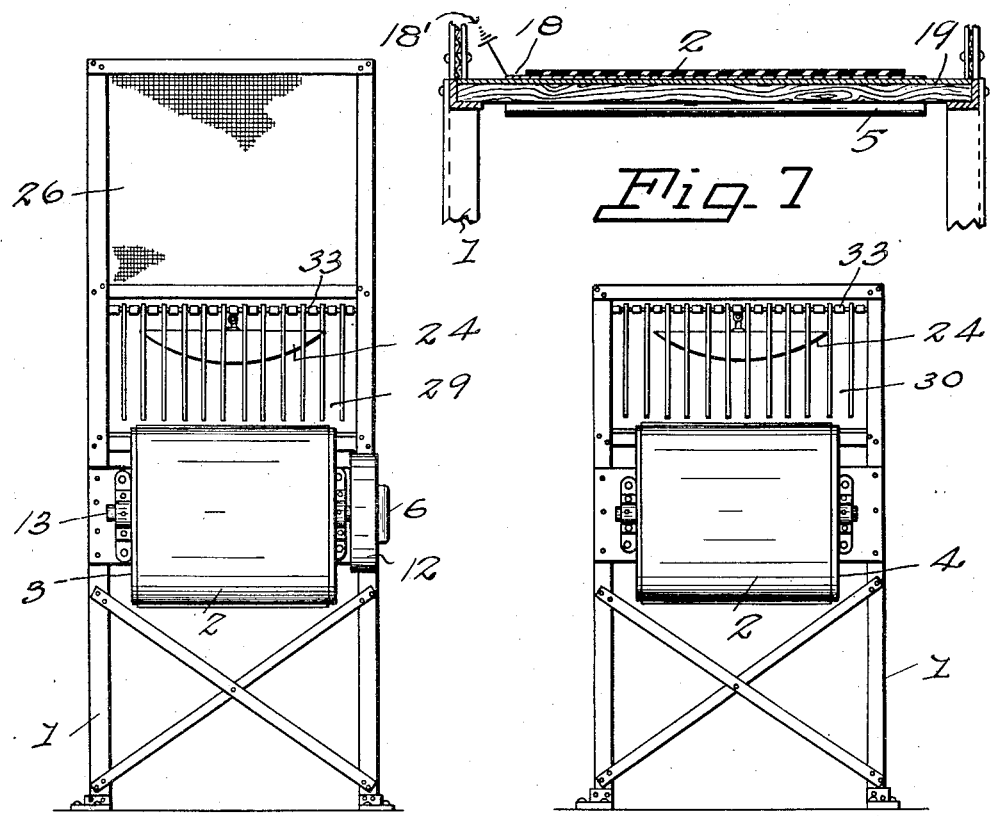
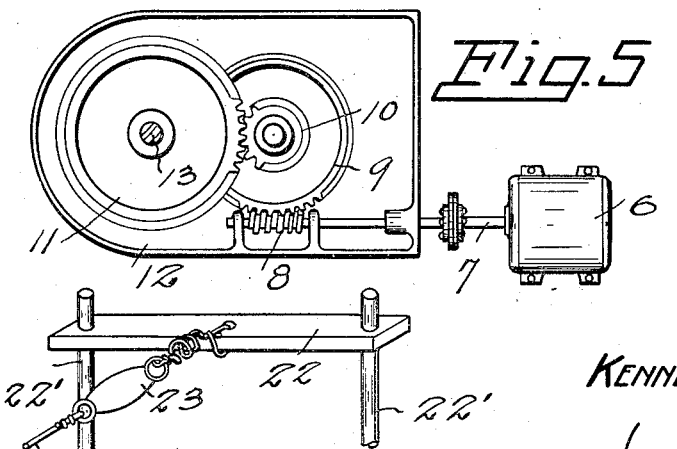
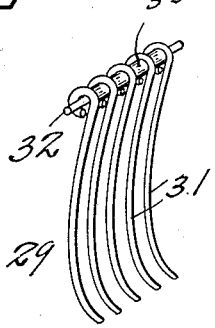
Kenneth E. Golden
Inventor
By Herbert E. Smith
Attorney Patented June 20, 1933

1,914,947

UNITED STATES PATENT OFFICE

KENNETH E. GOLDEN, OF SPOKANE, WASHINGTON, ASSIGNOR, BY MESNE ASSIGNMENTS, TO RAY-DIO-RAY MANUFACTURING CORPORATION, OF PORTLAND, OREGON

ELECTRIC APPLICATOR MACHINE

Application filed December 30, 1930. Serial No. 505,602.

My present invention relates to improvements in electric applicator machines adapted for use in the treatment of various materials for the destruction and elimination of undesirable bacteria, germs, insect eggs, larvæ, worms, insects &c., frequently found in food stuffs, tobacco, and other vegetable matters. In carrying out my invention the material to be treated or purified is deposited upon a conveyer or carrier and passed through a chamber or inclosure wherein it is subjected to waves, currents or rays produced by a high frequency electro-static generator and distributed by one or more distributer heads or applicators in order that the waves or currents may pass through the material in transit for the purification thereof.

A voltage is used ranging from 10,000 volts to 100,000 volts of high frequency, high potential, polarized oscillations, producing a powerful electro-static stress upon the material treated for the purpose above indicated, and my machine or apparatus is especially applicable for use in destroying life containing a considerable moisture or water content, as for instance insect eggs possessing moisture as a good conductor for the electrical forces or energy.

The machine is particularly adapted for the treatment of bulk products or package commodities, such as tobacco, in leaf form, or in cigars manufactured from the tobacco leaves. As is well known, the tobacco, when cured frequently becomes infested with the tobacco worm, eggs, larvæ &c., and unless these agencies are destroyed they are likely to destroy the value of the tobacco leaf or destroy the value of the cigars manufactured from such leaves. When tobacco, or other material is thus treated by the machine of my invention, these deleterious agencies are destroyed and eliminated, and the material is purified.

My invention consists in certain novel combinations and arrangements of parts as will hereinafter be more fully set forth and claimed. In the accompanying drawings I have illustrated one complete example of the physical embodiment of my invention wherein the parts are combined and arranged, according to one mode I have thus far devised for the practical application of the principles of my invention.

Figure 1 is a view in side elevation of a machine or apparatus embodying my invention, partly broken away for convenience of illustration.

Figure 2 is a top plan view of the apparatus, partly broken away as at line 2—2 of Figure 1.

Figure 3 is a front end view of the machine, and Figure 4 is a rear end elevation of the machine.

Figure 5 is a detail view of the driving means for the endless conveyer or carrier belt.

Figure 6 is a perspective view showing a portion of an electrical guard or gate utilized at the front and rear ends of the treating chamber.

Figure 7 is an enlarged transverse sectional view through the endless conveyer showing a metallic conductor plate and the supports for the upper or working flight of the endless belt or conveyer.

Figure 8 is a detail perspective view of the insulated connection and support for one end of the suspending aerial for the applicators, the latter used for treating the material.

In the preferred form of the invention as illustrated in the drawings I utilize a main frame 1 of suitable construction for the support of the endless conveyer 2, which may be a canvas belt of suitable size, and the upper or working flight of the belt is used to convey the material treated through the apparatus, from left to right in Figures 1 and 2.

The belt is supported on end rollers 3 and 4, and smaller rollers 5 are journaled transversely of the machine for guiding the belt or conveyer between these end rollers.

The endless belt is driven from an electric motor as 6 attached at one side of the frame near the front of the machine, and the shaft 6 of the motor transmits power to the reduction gearing 8, 9, 10, and 11, as best seen in Figure 5, and enclosed in a gear casing 12. The reduction gears drive the shaft 13 of the roller 11, and a feed chute 14 is supported at the front of the machine on a frame 15, in position to feed the material to the upper flight of the belt. At the rear end of the machine a discharge or delivery chute 16 is supported on its frame 17 in position to receive the treated material from the delivery end of the belt 2. The material is thus fed to the belt at the front end of the machine and the belt is of sufficient length to properly subject the material to the required treatment, after which the purified material is discharged at the rear end of the machine.

The upper or working flight of the belt, in addition to its support on the intermediate guide rollers 5, is supported by and passes over one or more metallic conductor plates 18, which are flat, and extend substantially throughout the length of the belt. This plate is a good conductor of electricity and is grounded, as indicated at 18' in Figure 7, and supported as at 19 in the main frame of the machine.

The material while being treated is passed through a tunnel or housing 20, preferably of wire mesh, and erected on the top of the main frame to form an enclosure or chamber through which the upper flight of the conveyer passes and conveys the material during its purifying process. The housing is insulated from the conductor plate, and is grounded as at 20' in Figure 1 to provide a shield of wire fabric surrounding the treating chamber and designed to collect and dispose of electric currents that might otherwise interfere with electrical apparatus, as for instance radio receiving sets, or other similar instruments.

In the upper portion of the treating chamber an aerial conductor or wire 21 is suspended, and extends substantially the length of the treating chamber. This conductor is suspended between the two end frames 22 of the housing, with insulated connections 23 between the support and the conductor, and a plurality of distributer heads 24, forming with their electrodes, applicators, are suspended from the conductor. The waves, currents, or rays of electrical energy thus emanate from the electrodes, (indicated as short wires 24' in Figure 1) and flow to and through the material carried on the endless conveyer, thence to the conductor plate, and to the ground connection 18'.

The applicators or distributer heads are illustrated as circular, convex disks, but may be of any suitable type and provided with electrodes that may be adapted for special purposes, or uses.

The main power wires for the machine are indicated at 25 and are connected to a generator 26, enclosed in a foraminous shield or casing 26' similar to the tunnel or housing 20, where the current is generated to the desired potential, and an inductance coil 27 connected with the generator is located in the front end of the housing 20, and utilized to intensify the current that is transmitted to the applicators through wire 28. The intensity of the treatment applied to the material may be varied by vertically moving the aerial conductor 21 toward or away from the conductor plate 18 and the material on the conveyer belt passing along the plate. For this purpose the end cross bars 22 that support the aerial conductor may be raised or lowered on their pairs of supporting posts 22' in Figure 8.

To prevent egress of the electro-static forces to the surrounding atmosphere with consequent electrical disturbances, the open ends of the housing, at front and rear, are provided with hinged gates designated as 29 and 30 for the feed and discharge ends of the housing respectively. Each of these gates, as seen in Figure 6 is composed of a suitable number of spaced wires 31, independently or separately hinged on a cross bar 32 between spacers or sleeves 33 on the cross rod. The wires are freely suspended so that the material, as it moves with the conveyer, will swing them out of the way, and then the wires will return by gravity to their normal, vertically suspended position. In this manner the housing 20, the case 26' and the front and rear gates 29 and 30 provide an enclosure for the whole machine to prevent egress of the high frequency electro-static forces used in the purifying treatment of the material from the machine to the atmosphere.

Having thus fully described my invention, what I claim as new and desire to secure by Letters Patent is:—

The combination with a frame and a housing, the latter forming an insulated and grounded conductor-shield and provided with end-openings, of an endless conveyer having a working flight passing through said openings and housing, a support in each end-opening, a series of spaced metallic fingers forming a gate and hinged to each support, a stationary conductor plate supporting said working flight, supporting posts rigid with the frame, vertically adjustable cross bars mounted on the posts, an applicator supported on the cross bars over the working flight, and electrical connections to said applicator and said plate.

In testimony whereof I affix my signature.

KENNETH E. GOLDEN.